(12) United States Patent
de Alvaro et al.

(10) Patent No.: US 6,927,189 B1
(45) Date of Patent: Aug. 9, 2005

(54) COATINGS

(75) Inventors: Francisco Lanzuela de Alvaro, Madrid (ES); Chandresh Nemchand Malde, Reading (GB); Michael Ian Petch, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/857,315

(22) PCT Filed: Nov. 22, 1999

(86) PCT No.: PCT/GB99/03858

§ 371 (c)(1),
(2), (4) Date: Oct. 16, 2001

(87) PCT Pub. No.: WO00/32311

PCT Pub. Date: Jun. 8, 2000

(30) Foreign Application Priority Data

Dec. 3, 1998 (GB) ............................. 9826486

(51) Int. Cl.$^7$ ................................. B01J 23/00
(52) U.S. Cl. ..................................... 502/300
(58) Field of Search ............................... 502/300, 313, 502/64, 66, 109, 527.12

(56) References Cited

U.S. PATENT DOCUMENTS

| | | | |
|---|---|---|---|
| 4,708,765 A | * | 11/1987 | Newman et al. ............... 216/84 |
| 4,806,427 A | | 2/1989 | Stein et al. |
| 4,891,350 A | | 1/1990 | Chopin et al. |
| 5,278,123 A | * | 1/1994 | Chopin et al. ............... 502/200 |
| 5,504,051 A | * | 4/1996 | Nakamura et al. ........... 502/261 |
| 5,516,851 A | * | 5/1996 | Flick et al. ............... 525/330.2 |
| 5,981,052 A | * | 11/1999 | Sugiyama ............... 428/311.71 |
| 6,033,458 A | * | 3/2000 | Goodman et al. ............... 95/45 |
| 6,194,650 B1 | * | 2/2001 | Wakayama et al. .......... 136/256 |

FOREIGN PATENT DOCUMENTS

| | | |
|---|---|---|
| DE | 2 300 932 | 7/1973 |
| DE | 35 26 383 | 7/1985 |
| EP | 0 266 257 | 5/1988 |
| EP | 0878233 A2 * | 4/1998 |
| EP | 0 878 233 | 11/1998 |

* cited by examiner

*Primary Examiner*—Stanley S. Silverman
*Assistant Examiner*—Colleen P. Cooke
(74) *Attorney, Agent, or Firm*—RatnerPrestia

(57) ABSTRACT

A substrate, such as a plate or catalyst monolith, may be coated with a metal oxide, particularly with a zeolite, by treating the substrate with a polyelectrolyte to form a coating, and then depositing the coating of metal oxide from an aqueous slurry. A continuous coating, which may incorporate many layers, can easily be formed. In the examples polyacrylamide is used as polyelectrolyte.

12 Claims, 1 Drawing Sheet

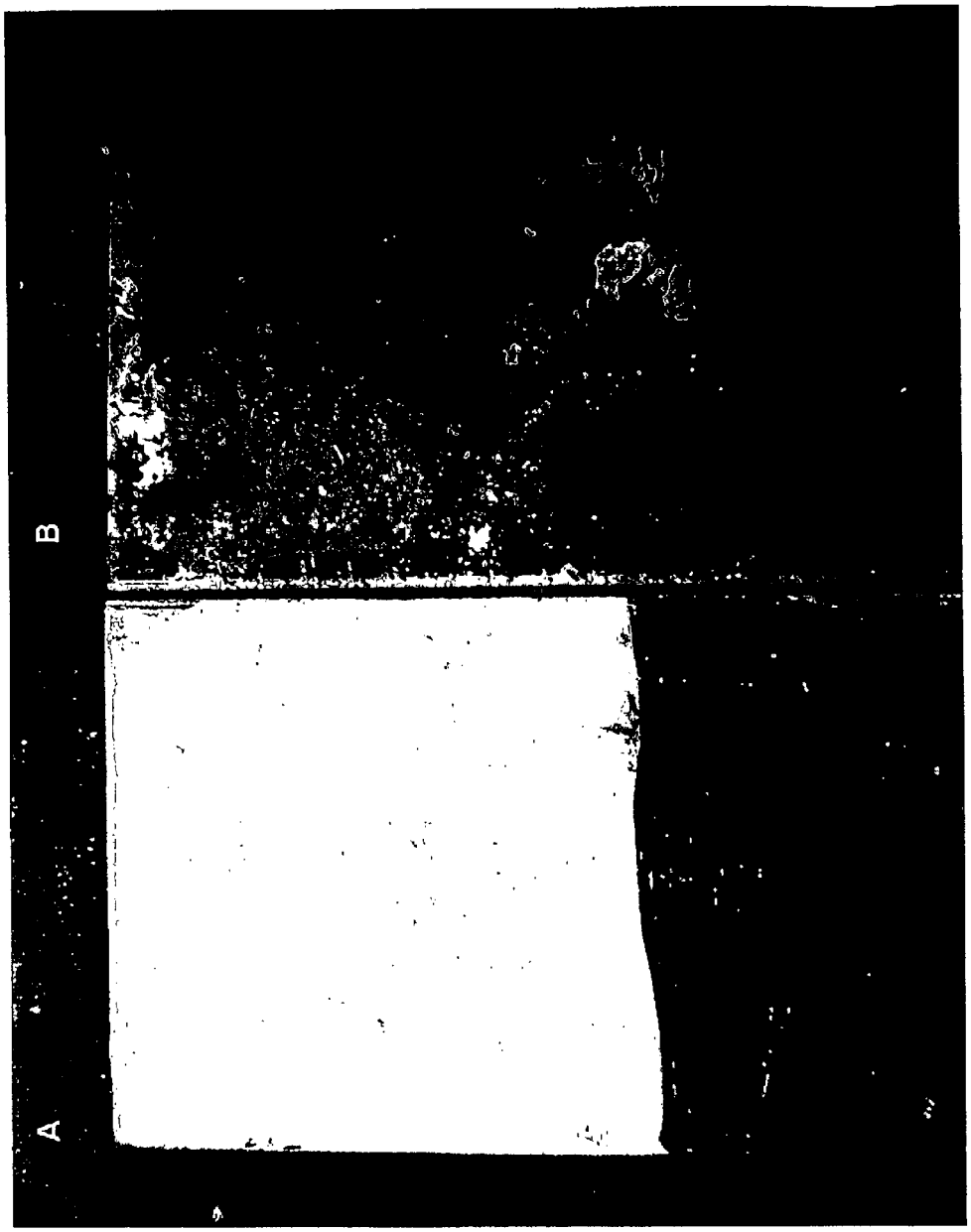

COATINGS

This invention concerns improvement in coatings, and more especially concerns improvements in methods of coating metal oxides and the like onto metallic or non-metallic substrates.

It is very well established to coat metal oxides, such as alumina, ceria, zirconia, etc, as single or mixed oxides, onto metal substrates and ceramic such as honeycomb through-flow catalyst supports, used in huge numbers in exhaust gas catalysts. This is generally achieved by admixing the metal oxide into an aqueous slurry together with suitable components including adhesion modifiers, of which the "Ludox" (Trade Mark) silica is an example, to form a washcoat slurry. The substrate is then dipped or drenched in the slurry, and fired to yield a high surface area base for the catalyst. The silica may form 50 wt % or more of the solids content of the slurry, and this clearly dilutes the interaction between the catalyst metal and the oxide, which is very important. There has not been significant improvement in these coating techniques for some 20 or 30 years, yet the design of exhaust gas catalysts is becoming more sophisticated and demanding, requiring new components such as zeolite and other multi-layers to be incorporated. We believe that traditional coating methods are failing to deal with new requirements, and in particular, traditional coating methods give problems in multi-layer coating.

We have previously disclosed the use of polyelectrolytes to coat catalyst particles etc with zeolites formed simultaneously in situ (see EP 878 233). We have now discovered that polyelectrolytes can be used to pre-treat metal and ceramic substrates without such in situ formation of the zeolites, in a process in which one or more pre-formed metal oxides, including zeolites and the like, is deposited onto the substrate, and not only is a sound, even coating obtained without requiring dilution with adhesion modifiers, (but may include such adhesion modifiers) but the coating is especially suitable for the deposition of further coatings of similar or differing type.

U.S. Pat. No. 4,806,427 discloses a process for depositing a catalytically active material onto a carrier wherein a polyelectrolyte may be added at 0.2–1.0 percent by weight as an acid-stable liquefier. DE 2300932 discloses coating a polyester resin substrate with a glue which is a polyacrylicamide and a polyvinyl alcohol.

SUMMARY OF INVENTION

Accordingly, the present invention provides a method of depositing metal oxide coatings onto a substrate, which comprises treating the surface of said substrate with a polyelectrolyte to yield a surface coating of the polyelectrolyte thereon, and subsequently or simultaneously treating the coated surface with an aqueous slurry comprising metal oxide particles. If required, additional layers of the same or different metal oxide may be applied, either to increase the loading of the metal oxide or to form a multilayer coating.

BRIEF DESCRIPTION OF THE DRAWINGS

FIG. 1 shows a substrate coated plate according to an embodiment of the present invention in A and a comparative exemplary substrate without a polyelectrolyte treatment in B.

Desirably, the polyelectrolyte is applied in the form of an aqueous solution eg a 0.01 to 20 wt % solution, in the case of the materials specifically described hereinafter a 4 wt % solution has been found satisfactory. The polyelectrolyte may be any suitable polyelectrolyte, eg anionic or cationic, but polyacrylamides are suitable, such as "Alcostat" (Trademark) 167 available from Allied Colloids Ltd, England. Other polyacrylamides may be considered. For such materials, desirably, the solution is alkaline, for example of pH of approximately 9. Routine to optimise the solution pH for each substrate and polyelectrolyte should be undertaken, and nay be acid or alkaline, primarily depending upon the surface chemistry of the substrate. Treatment of the substrate may be by any suitable method, including spraying, dipping, vacuum applications drenching using a "waterfall" and the like, and may be carried out at room temperature. Desirably, the polyelectrolyte solution is dried to form a continuous surface polymer layer.

The substrate may be any metal or ceramic material, in any form such as plate or monolith form, including particularly honeycomb through-flow catalyst support, but also devices of the type known as static mixers, which provide good gas or other fluid mixing. The metal may be, for example, a stainless steel including "Fecralloy" or aluminium, and the ceramic may be cordierite or the like. Other substrates which require, or may be protected by, an oxide coating, should also be considered.

The term metal oxide includes zeolites of all types and of all Si to Al ratios, and includes modified, eg ion-exchanged zeolites, as well as "Silicate" and recently-available zeolite-type compositions where Ga and In or other suitable metals are incorporated into the zeolite framework structure and single or mixed oxides, for example selected from one or more of ceria, zirconia, magnesia, alumina and silica. The metal oxide is desirably in the form of an aqueous slurry, eg of about 40 wt % solids content of particles of the appropriate particle size; if necessary the metal oxide may be milled to disperse the metal oxide whilst simultaneously size reducing. The slurry may, but need not, include an adhesion modifier, and may include other components including catalytically active particles and solutions of catalytically active metals and/or promoters therefore, for example the catalytic component may be one or more of the platinum group metals.

The slurry is then suitably applied by any method to the polyelectrolyte-coated substrate, and is the suitably dried. A final stage is desirable firing, or calcining, to firmly deposit the oxide coating on the substrate. Before the final firing, however, additional slurries of oxide and other components may be deposited, to result in a continuous or thicker coating or a multi-component series of coatings. If desired or necessary, a further polyelectrolyte layer may be applied, and one or more additional metal oxide or other coatings may be applied.

In an alternative embodiment, the polyelectrolyte is admixed with the slurry without a separate pre-coating step. Otherwise the process and materials considerations are fairly similar. This embodiment is expected to be particularly stable for depositing a thin, even coating.

It is believed, although we do not wish to be bound by any theory, that the polyelectrolyte acts to reverse the charge on the substrate, thus permitting the slurry particles to adhere firmly, and we believe that upon deposition of a second coating, the polyelectrolyte is "re-activated" and serves to cause excellent adhesion of the second coating.

It is believed that the invention has significant and unexpected benefits in achieving good coatings on substrates that have previously been difficult to coat, and in particular permits sound and adherent two or multi-layer coatings.

A particular embodiments of the invention (according to claim 8) provides a supported catalyst comprising a plate or monolith coats with a metal oxide, produced by the method of the invention.

The present invention is illustrated by the following examples.

EXAMPLE 1

An aluminium plate is soaked with aqueous 4 wt % polyacrylamide solution at pH 9. The wet plate is then dried to leave a thin surface coating of polyelectrolyte. The coated plate is dipped into a standard zeolite x,y washcoat slurry as used in the exhaust gas catalyst industry, containing 40 wt % zeolite, with the pH adjusted to between 8 and 9. The washcoat adheres to the plate, and the coated plate is removed and dried at 100° C. for 30 minutes. A further identical washcoat layer was then applied to deposit a desired thickness. The coated metal plate is then calcined at 400° C. for 2 hours, which removes the polyelectrolyte residue. A photograph of the thus-coated plate ("A") is shown in the accompanying drawing page. For comparison, the identical procedure was followed without the polyelectrolyte treatment. Although a first coating appeared successful and even, a second coating caused the combined coating to dramatically peel; a photograph of the coated plate is shown as "B" in the drawing. It can readily be seen that the present invention permits an even and continuous coating, whereas double coating without the polyelectrolyte results in flaking of the coating, and uneven, discontinuous coating.

Although the above Example utilised a 100% zeolite coating, other successful coatings can be applied with 50 wt % "Ludox" silica adhesion modifier, or any other proportion.

EXAMPLE 2

Zeolite 13X on Aluminium Sheet

An aluminium sheet was coated with zeolite 13X (Zeolyst Int.) using a polyelectrolyte aqueous solution (5% of Allied Colloids BLO6272AQ/Alcostat167, SD n°004569, and pH 9–10). After having fired the aluminium plate at 200° C., it was anodised in a 15% sulphuric acid solution. The plate was then coated with a thin layer of polyelectrolyte, then four consecutive passes of zeolite 13X were applied with a total weight gain of 0.57 g over a surface of approximately 5 in$^2$ (32 cm$^2$); this represented a loading improvement over 3 timer greater than could be achieved in previous experiments. Between the third and the fourth passes, a second layer of polyelectrolyte was necessary. Finally, the sheet was calcined at 300° C. to burn off the polyelectrolyte.

EXAMPLE 3

Zeolite 13X on Aluminium Monoliths

Two aluminium honeycomb monoliths of different cell density (400 and 200 cells per sq.in) were coated with zeolite 13X using a polyelectrolyte aqueous solution (5% of Allied Colloids BLO6272AQ/Alcostat167, SD n°00045768, and pH 9–10). The 400 and 200 cpsi monolith reached coatings of 2.7 and 3.2 g/in$^3$ receptively in fourteen consecutive passes of zeolite 13X with very low percentages of binder (below 5%). A polyelectrolyte layer was applied prior to the first pass and between the 11$^{th}$ and the 13$^{th}$ passe.

EXAMPLE 4

Zeolite Y on Aluminium Sheet

An aluminium sheet was coated with zeolite Y (Zeolyst Int.) using a polyelectrolyte aqueous solution (5% of Allied Colloids BLO6272AQ/Alcostat167, SD n°00045678, and pH 9–10). The aluminium plate was coated with a thin layer of polyelectrolyte, then three consecutive passes of zeolite Y were applied with a total weight gain of 0.81 g over a surface of approximately 1.55 in$^2$ (10 cm$^2$); previous tests using this zeolite without polyelectrolyte showed that the coating would completely disintegrate and peel off after two passes.

EXAMPLE 5

Zeolite Y on Aluminium Monoliths

An aluminium honeycomb monolith of 200 cpsi cell density was coated with zeolite Y using a polyelectrolyte aqueous solution (5% of Allied Colloids BLO6272AQ/Alcostat167, SD n°00045768, and pH 9–10. A polyelectrolyte layer was applied prior to the first pass. The monolith reached coatings of 4.2 g/in$^3$ of zeolite Y in seven consecutive passes

EXAMPLE 6

Zeolite 4A on "Fecralloy" Static Mixers

Static mixers (obtainable from Sulzer) made of "Fecralloy" metal were pre-heated to 900° C. for 1 hour and soaked in 5% wt Alcostat167 polyelectrolyte solution (Allied Colloids Ltd) at pH 9. The wet mixer is then dried to leave a thin surface polyelectrolyte coating. The mixer is then dipped in a slurry containing 35 wt % zeolite 4A with 5 wt % platinum, and 2 wt % Ludoz silica (DuPont). Excess zeolite is removed by blowing the coated mixer through with 80 psi of nitrogen This helps to free any blocked channels in the mixer. The coated mixer is then dried at 120° C./8 hrs, and calcined at 500° C./2 hrs. The calcination step burns off the polyelectrolyte layer, and leaves the zeolite coating intact In this case it results in a thick zeolite layer with coating density of 3.1 ginch$^{-3}$ throughout the mixer.

EXAMPLE 7

Alumina-based Catalyst on "Fecralloy" Static Mixers

A static mixer was coated, using the same methodology as in Example 6 with 5% Pt. 0.1% Fe on alumina catalyst. This catalyst was mixed with 7% Dispersal binder (Condea), and made into a 35 wt % aqueous washcoat. The resultant coating was observed to have good cohesion and integrity. A coating density of 3.7 ginch$^{-3}$ was achieved.

EXAMPLE 8

Zeolite H-ZSM-5 on Ceramic Monolith

A conventional cordierite monolith was successfully coated with H-ZSM-5 synthetic zeolite using the technique of Example 3. The test was repeated successfully using a mixture of zeolite and colloidal silica binder.

The invention may be modified by the skilled person without departing from the scope thereof.

What is claimed is:

1. A method of depositing metal oxide coatings onto a metal or ceramic substrate comprising the steps of treating a surface of said substrate with a polyelectrolyte to yield a surface coating of the polyelectrolyte thereon, and subsequently treating the surface with an aqueous slurry comprising metal oxide particles.

2. A method according to claim 1, wherein said polyelectrolyte is a polyacrylamide.

3. A method according to claim 1, wherein the metal or ceramic substrate is a catalyst support substrate in plate or monolith form.

4. A method according to claim 1, wherein the metal oxide is a zeolite.

5. A method according to claim 1, wherein the metal oxide is selected from alumina, silica, ceria, zirconia, magnesia and mixed oxide catalyst supports.

6. A method according to claim 4, wherein the metal oxide incorporates a catalytic component.

7. A method according to claim 6, wherein the catalytic component is one or more of the platinum group metals.

8. A supported catalyst comprising a plate or monolith coated with a metal oxide, produced according to claim 1.

9. A method according to claim 5, wherein the metal oxide incorporates a catalytic component.

10. A method according to claim 9, wherein the catalytic component is one or more of the platinum group metals.

11. A method according to claim 1, wherein the polyelectrolyte is applied in the form of an solution.

12. A method according to claim 11, wherein the aqueous solution is dried to form a continuous surface polymer layer.

* * * * *

UNITED STATES PATENT AND TRADEMARK OFFICE
CERTIFICATE OF CORRECTION

PATENT NO.     : 6,927,189 B1
DATED          : August 9, 2005
INVENTOR(S)    : de Alvaro et al.

It is certified that error appears in the above-identified patent and that said Letters Patent is hereby corrected as shown below:

Column 6,
Line 8, delete "an solution", and insert therefore -- an aqueous solution --.

Signed and Sealed this

Eighth Day of November, 2005

JON W. DUDAS
*Director of the United States Patent and Trademark Office*